United States Patent [19]

Berthel

[11] Patent Number: 4,504,823
[45] Date of Patent: Mar. 12, 1985

[54] HEAVY RAIN RATE WARNING INDICATOR

[76] Inventor: Robert O. Berthel, 94 Londonderry Rd., Wendham, N.H. 03087

[21] Appl. No.: 484,389

[22] Filed: Apr. 12, 1983

[51] Int. Cl.³ ............................................. G08B 21/00
[52] U.S. Cl. ..................................... 340/602; 73/171; 200/61.04
[58] Field of Search .............................. 340/602, 604; 200/61.04, 85 R; 177/50, 121; 73/171, 861.75, 290 B, 296, 313, 317

[56] References Cited

U.S. PATENT DOCUMENTS

| | | | |
|---|---|---|---|
| 835,920 | 11/1906 | Steinhauser | 73/296 |
| 1,143,246 | 6/1915 | Barrash | 200/85 R |
| 1,217,036 | 2/1917 | McManus | 340/602 X |
| 1,280,136 | 10/1918 | Blackmore | 340/602 X |
| 1,295,227 | 2/1919 | Soderquist | 340/602 X |
| 1,481,322 | 1/1924 | Kellum | 73/317 X |
| 2,513,605 | 7/1950 | Vernon | 73/171 X |
| 2,856,476 | 10/1958 | Kaiser et al. | 200/61.04 |
| 3,309,474 | 3/1967 | Heinrich | 200/61.07 |
| 3,485,096 | 12/1969 | Miller | 73/171 |
| 3,978,723 | 9/1976 | Davis | 73/171 |

FOREIGN PATENT DOCUMENTS 1270221 10/1960 France ................. 73/171

Primary Examiner—James L. Rowland
Assistant Examiner—Daniel Myer
Attorney, Agent, or Firm—Donald J. Singer; Jacob N. Erlich

[57] ABSTRACT

A heavy rain rate warning indicator having a housing which has a first opening in the top and a second opening in the bottom. A rain collector/feeder is located in the first opening for directing collected rain in a stream onto a flat plate, pivotally mounted within the housing. A predetermined amount of movement of the flat plate causes the activation of a switch which in turn provides a signal to an alarm system indicative of heavy or severe rainfall. In addition, a gear arrangement can be operably connected to a support rod for the flat plate in order to provide instantaneous rain rate information.

7 Claims, 3 Drawing Figures

HEAVY RAIN RATE WARNING INDICATOR

STATEMENT OF GOVERNMENT INTEREST

The invention described herein may be manufactured and used by or for the Government for governmental purposes without the payment of any royalty thereon.

BACKGROUND OF THE INVENTION

This invention relates generally to rain rate indicators, and, more particularly, to a rain rate indicator which is capable of providing a warning indication of heavy or severe localized concentrations of rainfall.

Many storm situations produce unexpected, localized "shafts" of severe/heavy concentrations of rainfall. Measurements taken during rain storms have shown that factors of ten in rain rate variability within a matter of seconds are not uncommon. In fact, these types of measurements are consistent even in wide spread rain situations, not just in severe or heavy rain scenarios. Preliminary studies indicate that areas of heavier rainfall, up to several hundreds of meters in diameter, are imbedded within storms and that these localized "shafts" of rainfall are continuously in a state of change, thus, they will form, grow while moving with the prevailing winds, and then dissipate. Consequently, their numbers, sizes and intensities are as unpredictable as their existence is predictable.

Such heavy, localized "shafts" of severe concentrations of rainfall are of great concern, especially during the landing or takeoff of aircraft. Studies have raised the possibility that heavy rain could be a contributing factor in a number of aircraft accidents. A sufficient amount of water striking a flying aircraft can cause a significant decrease in aerodynamic lift, increase in weight, increase in drag from the force of the raindrops striking the aircraft, and the possiblity of a malfunction of the aircraft engine. Since an aircraft, especially when landing or taking off, is exceptionally vulnerable to external conditions that can alter its aerodynamic efficiency, one can easily postulate the results of such severe/heavy rainfall if a fully loaded aircraft passes through a "shaft" of severe rain at a critical point during approaching or leaving an airfield.

Consequently, aircraft safety dictates the necessity for some type of detection system to be installed at airports whereby "shafts" of severe rain can be detected over a circular area of several miles in diameter around the airport runway. Presently, the most feasible method of such rainfall rate detection is radar. Detection of rain "shafts" of relatively small diameter close to the ground, if at all possible, requires a highly sophisticated weather radar system of extremely high cost. In addition, this type of radar system must be maintained and operated by high-cost technicians. Other types of currently available rain rate indicators are ineffective since they generally react too slowly and are not designed as warning indicators of heavy rain rates.

Therefore, it is abundantly clear that some type of effective, cost efficient, and reliable severe/heavy rain warning indicator would be highly desirable. The use of this type of severe/heavy rain warning indicator although primarily applicable in conjunction with airport runways, could also find applicability in any area of use in which indication of severe or heavy rain is required.

SUMMARY OF THE INVENTION

The present invention overcomes the problems encountered in the past and as set forth in detail hereinabove by providing a severe/heavy rain rate warning indicator that can be readily adapted for use with current airport runways. The severe rain rate warning indicator of the present invention is made up of a housing containing therein a rain collector/feeder, a detecting system, and an electronic switching arrangement for providing a signal for actuating an alarm system.

The rain collector/feeder is made up of a straight-walled container having an open top and a very slightly inclined bottom surface for directing the collected rain in a concentrated stream through an outlet port and onto a portion of the detection system. Although the rain collector/feeder may vary in size, it is necessary that the walls of the feeder be straight and that the bottom directing surface be only minimally angled from the horizontal in the range of, for example, approximately 1° or less in order to avoid the problems encountered by the use of a funnel-type collector. By eliminating the funnel-type collector, the inherent problem associated therewith of imparting varying degrees of momentum to the collected water or rain, is eliminated.

The detection system incorporated within the rain rate indicator of this invention includes a rod pivotally mounted upon a support, the rod having a flat, circular plate at one end thereof and an adjustable counterweight or spring associated with the other end thereof. The flat, circular plate does not collect water or rain but is positioned adjacent the outlet port of the collector/feeder so as to accept or be struck by the stream of water flowing from the outlet port of the collector/feeder mentioned above. The rod has a hub extending from substantially the center thereof in order for the rod to freely pivot about the upstanding support. Since the present invention does not require rain collection, precise movement of the rod is not required, thus negating the need for expensive bearings.

More specifically, the flat plate connected at one end of the rod serves as a striking surface for the water falling from the port of the collector/feeder. The force of the falling water on the plate causes this end of the rod to move downward thus forcing the opposite end of the rod upward. The counterweight or spring attached to the other end of the rod governs the specific amount of movement of the rod and this movement is related to a specific force of water flow or rain rate. Thus, the counterweight is utilized as a means of calibration.

Any suitable type of electronic switch is operably connected to the hub of the rod. The electronic switch is positioned so as to be actuated by a determined upward movement of the other end of the rod (or downward movement of the flat plate). A predetermined amount of movement of the rod can be utilized to trigger the electronic switch in order to provide a signal which can be utilized to activate an alarm system thereby being indicative of the presence of severe or heavy rain. The alarm system is generally located within an airport control tower, however, the alarm system may be as simple as a buzzer, bell or light located within the housing of the indicator. In the alternative, however, this alarm could be as complicated as a computerized graphic system to record the output from a plurality of such indicators so as to plot the movement of the severe portions of a rainstorm.

In addition to the above-mentioned components of the indicator of this invention, a rain shield may be placed within the housing between the flat plate of the rod and the electronic components. The shield is constructed with a slot for the rod to pass through in order to allow free movement of the rod yet to prevent any water from adversely impacting upon the operation of the electronic components within the housing. Even further, a conical shaped wire mesh could be utilized to cover the open top of the rain collector/feeder to prevent large pieces of debris from clogging the outlet port.

Furthermore, with minor modifications, the heavy rain rate warning indicator of the present invention could actually act as a rain rate measuring device. In this instance, a gear connected between the rod and a variable resistor would allow current to flow therethrough in accordance with the movement of the rod (or rain rate). In this manner, the present invention could give instantaneous and continuous rain rate information which could be recorded by a number of currently available devices. This modification of the indicator of this invention would be most applicable to rain rates of medium to severe intensities since small rates would not supply sufficient force on the flat plate to cause movement of the rod.

It is therefore an object of this invention to provide a heavy rain rate warning indicator which is extremely simple to construct yet highly reliable in operation.

It is another object of this invention to provide a heavy rain rate warning indicator which can be operated in the field without constant supervision.

It is a further object of this invention to provide a heavy rain rate warning indicator which is substantially, maintenance-free in operation.

It is an even further object of this invention to provide a heavy rain rate warning indicator which can be reliably utilized as a warning system and/or a medium to heavy rain-rate direct-reading indicator without the provision of having a weighing type collection system.

It is still a further object of this invention to provide a heavy rain rate warning indicator whose operation is caused only by the force produced by collected water.

It is an even further object of this invention to provide a heavy rain rate warning indicator which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

DETAILED DESCRIPTION OF THE PREFERRED EMBODIMENT

Figure 1:
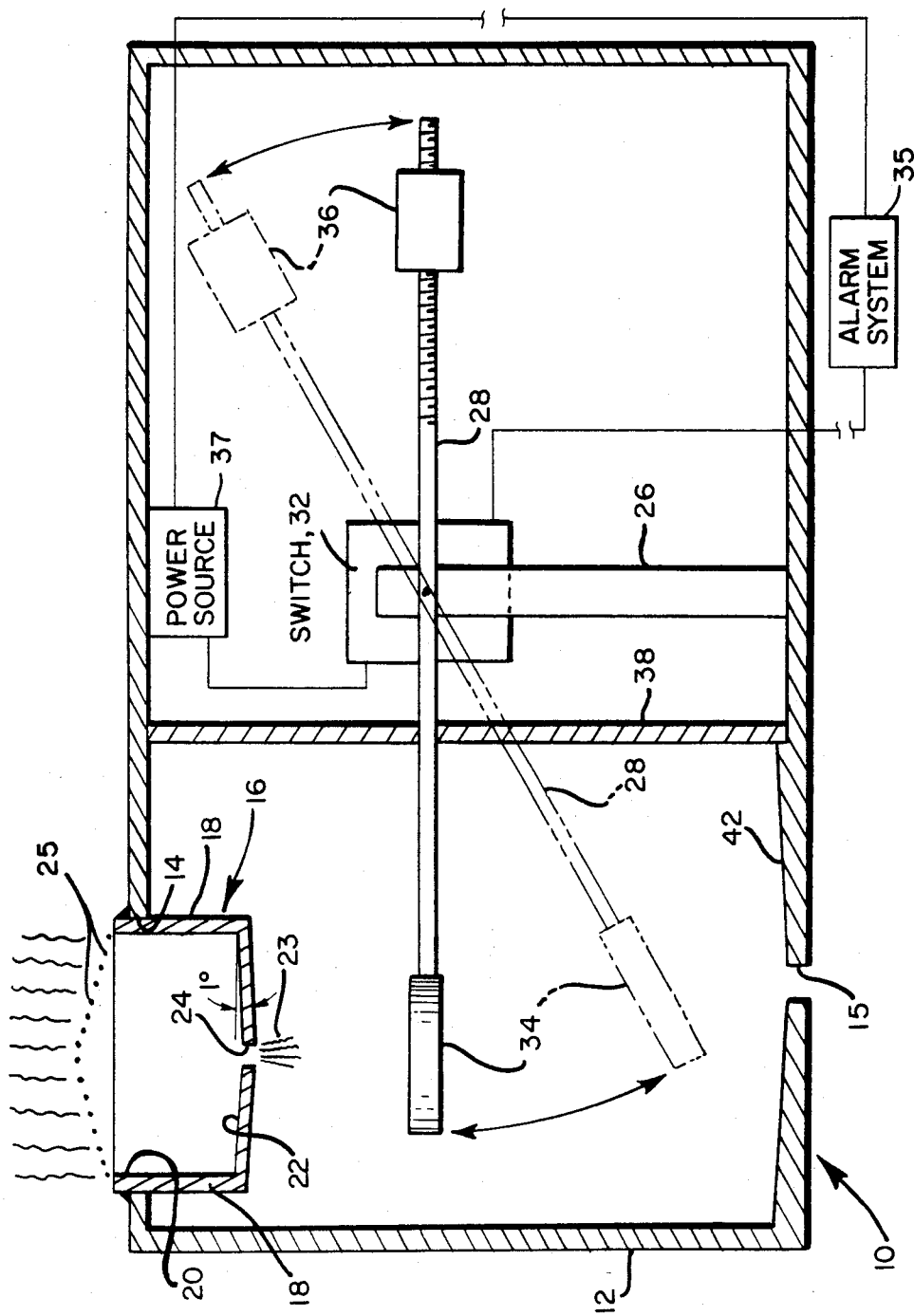
FIG. 1 is a side elevational view of the heavy rain rate warning indicator of the present invention shown partly in cross section.

Reference is now made to FIG. 1 of the drawing which shows, in a cross sectional view, the heavy rain rate warning indicator 10 of the present invention. Indicator 10 is made up of a housing 12 which encloses therein the major components of the present invention. By so enclosing the components of indicator 10 within a housing 12, these components remain unexposed to the surrounding environment, and therefore provide a lengthy, reliable operation of indicator 10. More specifically, housing 12 is preferably of a rectangular configuration and has an opening 14 cutout within the top portion thereof and a small aperture or opening 15 at the bottom.

Fixedly secured to a top surface of housing 12 within opening 14 is rain collector/feeder 16. Feeder 16 may be fixedly positioned within housing 12 by any suitable securing method such as spot welding to housing 12. Rain collector/feeder 16 is of a container-like shape having straight sidewalls 18 having an open rain inlet end 20 and a slightly inclined rain directing surface 22 at the other end thereof. The center of directing surface 22 has an outlet port 24 formed therein which allows for the passage therethrough of a stream 23 of collected rainfall in a manner to be described hereinbelow. In addition, if necessary, a conically-shaped wire mesh screen 25 can be positioned over the open end 20 of feeder 16 in order to prevent large pieces of debris (paper, twigs, leaves, etc.) from clogging port 24.

Still referring to the components of the indicator 10 of the present invention, located within housing 12 is an upstanding support 26 upon which is pivotally mounted a rod 28. Rod 28 has a central hub 30 (shown more clearly in FIG. 2) extending therefrom. Hub 30 may be formed as an integral part of rod 28 or be fixedly attached thereto. Hub 30 passes through support 26 and is operably connected to any suitable conventional electronic switch 32 in a manner to be described in detail hereinbelow.

It should be noted it is essential that the slightly inclined directing surface 22 be inclined at approximately 1° or less from the horizontal in order to eliminate any of the problems associated with a true funnel-like configuration. For example, a major problem of the funnel-like configuration is the imparting of varying degrees of momentum to the collected water depending upon where, on the funnel's surface, the raindrops fall.

A flat, circular plate 34 is connected or formed as part of one end of rod 28 and serves as a striking surface for the flowing stream of water 23 which exits port 24. The force of the falling water 23 on plate 34 causes this end of the rod 28 to move downward and the other end of rod 28 to move upward in the manner indicated in the dashed lines shown in FIG. 1 of the drawing. Since the indicator 10 of the present invention is not utilized for accurate rain collection data it is merely necessary for rod 28 to be supported for rotational movement about support 26. Therefore expensive bearings for precise movement of rod 28 is unnecessary.

A counterweight 36 threaded on rod 28, or a spring (not shown) connected between rod 28 and housing 12 is utilized to govern the specific amount of force required for rotational movement of rod 28 to take place. It is this counterweight 36 which is therefore utilized as a means for calibrating indicator 10 and determining the amount of force necessary to move rod 28.

An electronic switch 32 (or switches) is positioned adjacent support 26 in an operable relationship to hub 30 in order to be activated by the rotational movement of rod 28. This arrangement is more clearly illustrated in FIG. 2 of the drawing. The signal emanating from switch 32 is transported to a conventional alarm system 35 preferably located in an airport control tower, or if desired directly within housing 12. Any conventional power supply 37 provides power to switch 32 and alarm system 35. Although the alarm system 35 may be as simple as buzzer, bell or light, it may also be as complicated as a computerized graphic system which could be used to record the output from a series of indicators 10 and plot the movement of severe portions of a rainstorm.

Figure 2:
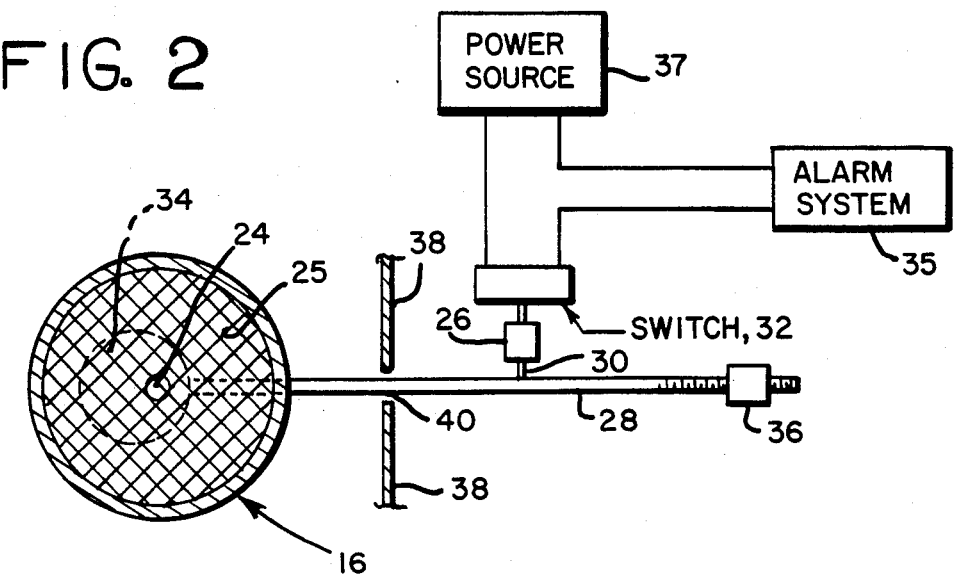
FIG. 2 is a schematically illustrated plan view of the major components of the heavy rain rate warning indicator of the present invention.

Still referring to FIGS. 1 and 2 of the drawing a shield 38 may be positioned within housing 12 in order to prevent any of the water splashing upon flat plate 34 within housing 12 from interfering with the action of rod 28 or the electronic components associated therewith. As clearly shown in FIG. 2 of the drawing a slot 40 is vertically formed within shield 38 to allow for the free movement of rod 28.

In addition, there is an inclined surface 42 formed within the bottom portion of housing 12 adjacent shield 38, the inclined surface 42 having centrally located opening 15 therein to allow for removal from housing 12 of the water which struck flat plate 34 during operation of indicator 10 of this invention.

The heavy rain rate warning indicator of the present invention substantially differs from the rain rate measuring devices of the past in that it does not rely upon measurements of water amounts for its warning indication. It is the force produced by the collected water flowing from central port 24 of collector/feeder 16 onto flat plate 34 which forces rotational movement of rod 28 and therefore provides a signal from switch 32. This force of flowing water is related to rain intensity or the amount of water falling into, or more specifically, flowing out of the collector/feeder 16. As a result, excess water is allowed to floe through port 15 in housing 12 and to spill harmlessly onto the ground after imparting a force onto the flat plate 34. In this manner, there is no need for any water storage, volume measurements and subsequent emptying of a storage container.

Figure 3:
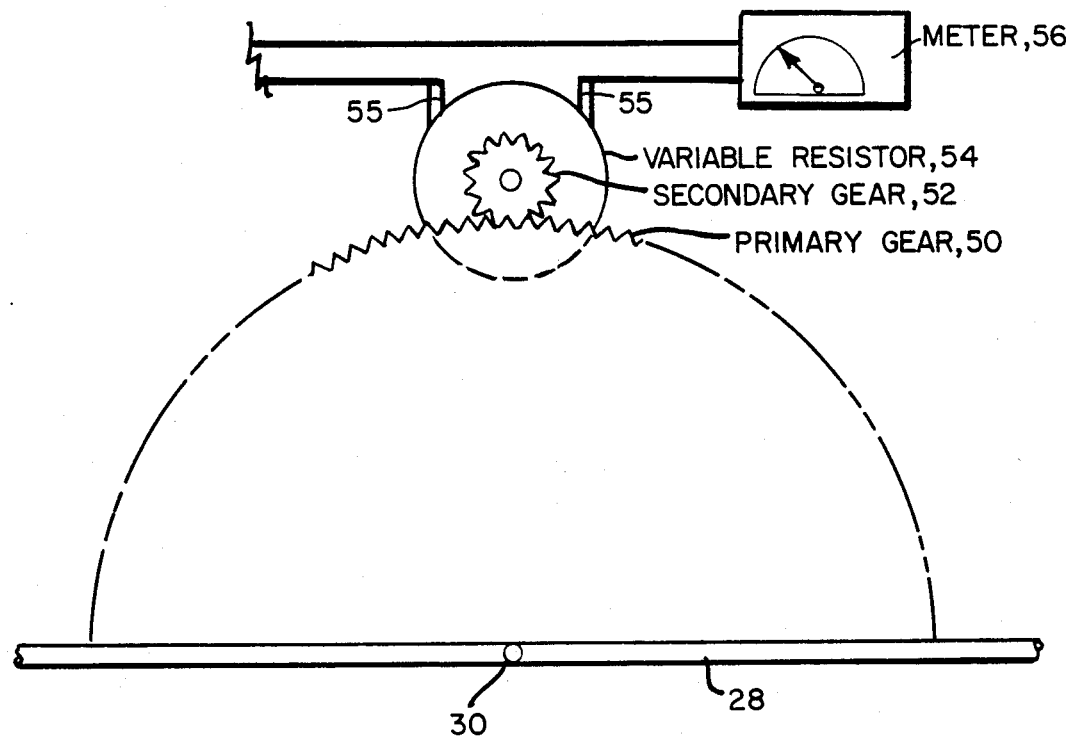
FIG. 3 is a schematic illustration of the components necessary in order to convert the heavy rain rate warning indicator of the present invention to a device which is also capable of providing direct-reading, rain rate information.

Reference is now made to FIG. 3 of the drawing which schematically illustrates a minor modification of the warning indicator 10 of the present invention which allows indicator 10 to be utilized as a rain rate measuring device. Since substantially all of the elements shown in FIGS. 1 and 2 are applicable to the embodiment shown in FIG. 3 of the drawing only the modification of indicator 10 is illustrated in FIG. 3. As shown in FIG. 3, rod 28 has associated therewith a primary gear 50 either directly adhered thereto or directly connected to the hub 30. A secondary gear 52 and variable resistor 54 are operably connected to gear 50. The movement of gears 50 and 52 drives the variable resistor 54 which by means of any suitable, conventional brushes 55 in turn provides a signal to any suitable, conventional meter or recorder 56 indicative of rain rate. As a result, indicator 10 of the present invention, with the modification shown in FIG. 3 of the drawing and set forth hereinabove, provides instantaneous and continuous rain rate information which can be recorded in a conventional manner. It should be noted, however, that this use will only be applicable to rain of medium and heavy intensity since light rain would create insufficient force on flat plate 34 for an accurate movement of the rod 28.

MODE OF OPERATION

In use, a plurality of heavy rain rate warning indicators 10 of the present invention are positioned at several locations around an area of concern. One such area of concern could be the runway of an airport, although, it should be realized that the warning indicator 10 of this invention can be used in any situation in which a warning of heavy or severe rain might be desirable. By positioning a plurality of indicators 10 upon an airport runway, indicator 10 of this invention provides a relatively maintenance-free device capable of providing an indication and/or warning of heavy or severe rain. The only required power for the indicator 10 would be in the form of an auxilliary power source 37, preferably battery operated, capable of transmitting the rain rate information to the alarm system 35 located at, for example, an airport control tower. If desired, however, information transmission could be made by ground wire or inexpensive radio transmitters.

By the appropriate adjustment of counterweight 36 on rod 28, the amount of force required to rotate rod 28 can be preselected. During a heavy or severe rainstorm, water flowing from port 24 in collector/feeder 16 onto flat plate 34 provides the force necessary to rotate rod 28. Sufficient rotation of rod 28 causes activation of switch 32 and subsequent sounding of the alarm system 35.

Although this invention has been described with reference to particular embodiments, it will be understood that this invention is also capable of further and other embodiments within the spirit and scope of the appended claims.

I claim:

1. A heavy rain rate warning indicator comprising:
   a housing, said housing having a first opening at the top thereof and a second opening at the bottom thereof;
   means situated within said first opening for collecting rain and directing a stream of rain water therethrough, said collecting and directing means having straight sidewalls, an open top surface, a port centrally located at the bottom thereof, and a slightly inclined bottom surface adjacent said port, said surface being inclined at approximately 1° or less from the horizontal;
   means operably associated with said collecting and directing means for receiving said stream of rain water and providing a signal indicative of a predetermined amount of force of said rain water, said liquid receiving and signal providing means including a support, a rod pivotally mounted on said support, a flat plate being secured adjacent one end of said rod and positioned juxtaposed said port in said collecting and directing means, means associated with the other end of said rod for regulating the amount of force necessary to move said rod, and a switch operably connected to said rod capable of being activated by a predetermined movement of said rod and said flat plate in order to provide said signal indicative of said predetermined amount of force of rain water striking said flat plate; and
   means operably connected to said switch for receiving said signal indicative of said predetermined amount of said force of rain water and providing an alarm;

whereby said alarm provides a warning indication of heavy or severe localized concentrations of rainfall.

2. A heavy rain rate warning indicator as defined in claim 1 further comprising means located within said housing for shielding said switch from said stream of rain water after said stream strikes said flat plate, said shielding means including an upstanding sheet being disposed adjacent to said support and having a vertically extending slot therein through which said rod passes.

3. A heavy rain rate warning indicator as defined in claim 2 wherein said collecting and feeding means includes means associated with said open top surface for preventing debris from clogging said port associated therewith.

4. A heavy rain rate warning indicator as defined in claim 1 further comprising means operably connected to said rod for providing an output representative of instantaneous rain rate information.

5. A heavy rain rate warning indicator as defined in claim 4 wherein said instantaneous rain rate information providing means comprises a first gear connected to said rod, a second gear operably connected to said first gear, and a variable resistor operably associated with said second gear, said variable resistor providing a signal indicative of the amount of movement of said rod and therefore said rain rate.

6. A heavy rain rate warning indicator as defined in claim 5 wherein said instantaneous rain rate information providing means further comprises a meter connected to said variable resistor for providing an actual indication of said rain rate.

7. A heavy rain rate warning indicator as defined in claim 6 further comprising means located within said housing for shielding said switch from said stream of rain water after said stream strikes said flat plate, said shielding means including an upstanding sheet being disposed adjacent to said support and having a vertically extending slot therein through which said rod passes.

* * * * *